US010221890B1

(12) United States Patent
Brieschke

(10) Patent No.: US 10,221,890 B1
(45) Date of Patent: Mar. 5, 2019

(54) LUBRICATION APPARATUS

(71) Applicant: Aries Engineering Co., Inc., Dundee, MI (US)

(72) Inventor: Mark A. Brieschke, Ida, MI (US)

(73) Assignee: Aries Engineering Co., Inc., Dundee, MI (US)

(*) Notice: Subject to any disclaimer, the term of this patent is extended or adjusted under 35 U.S.C. 154(b) by 0 days.

(21) Appl. No.: 15/791,494

(22) Filed: Oct. 24, 2017

(51) Int. Cl.
| | |
|---|---|
| F16C 17/04 | (2006.01) |
| F16C 33/10 | (2006.01) |
| F16C 41/00 | (2006.01) |
| F16N 7/14 | (2006.01) |
| F16N 11/00 | (2006.01) |
| F16C 33/66 | (2006.01) |
| F01D 25/18 | (2006.01) |

(52) U.S. Cl.
CPC .......... F16C 33/1045 (2013.01); F16C 17/04 (2013.01); F16C 33/1025 (2013.01); F16C 33/6659 (2013.01); F16C 41/007 (2013.01); F16N 7/14 (2013.01); F01D 25/18 (2013.01); F16N 11/00 (2013.01)

(58) Field of Classification Search
CPC .... F16C 17/04; F16C 33/103; F16C 33/1025; F16C 33/1045; F16C 41/007; F16C 33/6659; F01D 25/18; F10N 7/12; F10N 11/00; F16N 7/14; F16N 11/08; F16N 19/003; F16N 33/00; F16N 2260/04; F16N 7/12
USPC ....... 384/311, 322, 392, 381, 398, 412, 416, 384/462, 468, 901, 907; 184/101, 103.1, 184/103.2, 104.1
See application file for complete search history.

(56) References Cited

U.S. PATENT DOCUMENTS

| | | | | |
|---|---|---|---|---|
| 2,060,297 A | * | 11/1936 | Fox .......................... | F16N 3/12 |
| | | | | 222/256 |
| 2,310,473 A | * | 2/1943 | Svendsen ................ | F16C 17/04 |
| | | | | 384/590 |
| 3,338,333 A | * | 8/1967 | Wraase ............... | F16C 33/6622 |
| | | | | 184/105.1 |
| 3,592,020 A | * | 7/1971 | Brewer .................... | D21F 1/02 |
| | | | | 464/113 |

(Continued)

FOREIGN PATENT DOCUMENTS

| | | | | |
|---|---|---|---|---|
| EP | 1550812 A1 | * | 7/2005 | .......... F01D 25/125 |
| JP | 2009012100 A | | 1/2009 | |

*Primary Examiner* — Marcus Charles
(74) *Attorney, Agent, or Firm* — MacMillan, Sobanski & Todd, LLC

(57) ABSTRACT

A lubrication apparatus is provided. The lubrication apparatus includes a tray having opposing sides, opposing ends, a bottom member and a cavity formed therewithin. A plurality of roller assemblies is positioned within the cavity. The roller assemblies are configured for rotation and further configured to receive the bushing therebetween. A motor is mounted to the tray and configured to rotate the plurality of roller assemblies. Rotation of the plurality of roller assemblies urges rotation of the bushing. A lubricant material is positioned in the tray and configured to contact the roller assemblies. Rotation of the roller assemblies brings the lubricant material into contact with the outer surface of the bushing. The motor and the roller assemblies are further configured such that a single revolution of the bushing results in a substantially uniform layer of a lubricant material on the outer surface of a bushing.

20 Claims, 5 Drawing Sheets

(56) References Cited

U.S. PATENT DOCUMENTS

| | | | |
|---|---|---|---|
| 3,632,240 A * | 1/1972 | Dworak | F04C 2/086 |
| | | | 417/DIG. 1 |
| 3,662,858 A * | 5/1972 | Peterson | F16C 33/1025 |
| | | | 184/103.1 |
| 4,339,865 A | 7/1982 | Shultz | |
| 6,415,492 B1 | 7/2002 | Jamison | |
| 6,446,328 B1 | 9/2002 | Heflin | |
| 7,191,504 B1 | 3/2007 | Charron | |
| 7,918,003 B2 | 4/2011 | Acciardo, Jr. | |
| 2008/0230319 A1* | 9/2008 | Park | F16C 33/102 |
| | | | 184/105.3 |
| 2008/0313889 A1 | 12/2008 | Tilley | |
| 2013/0150205 A1* | 6/2013 | Wu | F16H 57/08 |
| | | | 475/347 |

* cited by examiner

LUBRICATION APPARATUS

BACKGROUND

A bushing can be used in a variety of assemblies and mechanisms. In its simplest form, a bushing is a structure that is inserted into a carrier or housing and configured to provide a bearing surface for rotary applications.

Common bushing designs include solid (sleeve and flanged), split, and clenched bushings. A sleeve, split, or clenched bushing includes a "sleeve" of material with an inner diameter (ID), outer diameter (OD), and length. The difference between the three types is that a solid sleeved bushing is solid all the way around, a split bushing has a cut along its length, and a clenched bearing is similar to a split bushing but with a clench (or clinch) across the cut connecting the parts. A flanged bushing is a sleeve bushing with a flange at one end extending radially outward from the OD. The flange is used to positively locate the bushing when it is installed or to provide a thrust-bearing surface.

It is known to install a bushing into a carrier or housing with processes that can involve pressing the bushing into the carrier or housing, such that the outer surface of the bushing engages an inner surface of the carrier or housing with an interference fit. Depending on the sizes of the bushing and the carrier or housing and then nature of the interference fit, the insertion force, that is the force required to press the bushing into the carrier or housing, can be considerable.

It would be advantageous if the processes for inserting a bushing into a carrier or housing can be improved.

SUMMARY

It should be appreciated that this Summary is provided to introduce a selection of concepts in a simplified form, the concepts being further described below. This Summary is not intended to identify key features or essential features of this disclosure, nor is it intended to limit the scope of the lubrication apparatus.

The above objects as well as other objects not specifically enumerated are achieved by a lubrication apparatus configured to apply a uniform layer of a lubricant material to a surface of a bushing. The lubrication apparatus includes a tray having opposing sides and opposing ends. The opposing sides and opposing ends are attached to a bottom member such as to form a cavity therewithin. A plurality of roller assemblies is positioned within the cavity. The roller assemblies are configured for rotation and further configured to receive the bushing therebetween. A motor is mounted to the tray and configured to rotate the plurality of roller assemblies. Rotation of the plurality of roller assemblies urges rotation of the bushing. A lubricant material is positioned in the tray and configured to contact the roller assemblies. Rotation of the roller assemblies brings the lubricant material into contact with the outer surface of the bushing. The motor and the roller assemblies are further configured such that a single revolution of the bushing results in a uniform layer of a lubricant material on the outer surface of a bushing.

There is also provided a method of applying a uniform layer of a lubricant material to an outer surface of a bushing. The method includes the steps of forming a cavity within a tray, positioning a plurality of roller assemblies within the cavity, the roller assemblies configured for rotation, the roller assemblies further configured to receive the bushing therebetween, rotating the plurality of roller assemblies with a motor, wherein rotation of the plurality of roller assemblies urges rotation of the bushing, positioning a lubricant material within the tray such that the lubricant material contact the roller assemblies, wherein rotation of the roller assemblies brings the lubricant material into contact with a surface of the bushing and rotating the roller assemblies with a single revolution, thereby forming a substantially uniform layer of the lubricant material on the outer surface of a bushing.

Various objects and advantages of the lubrication apparatus will become apparent to those skilled in the art from the following detailed description, when read in light of the accompanying drawings.

DETAILED DESCRIPTION

The lubrication apparatus will now be described with occasional reference to specific embodiments. The lubrication apparatus may, however, be embodied in different forms and should not be construed as limited to the embodiments set forth herein. Rather, these embodiments are provided so that this disclosure will be thorough and complete, and will fully convey the scope of the lubrication apparatus to those skilled in the art.

Unless otherwise defined, all technical and scientific terms used herein have the same meaning as commonly understood by one of ordinary skill in the art to which the lubrication apparatus belongs. The terminology used in the description of the lubrication apparatus is for describing particular embodiments only and is not intended to be limiting of the lubrication apparatus. As used in the description of the lubrication apparatus and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the lubrication apparatus. Notwithstanding that the numerical ranges and parameters setting forth the broad scope of the lubrication apparatus are approximations, the numerical values set forth in the specific examples are reported as precisely as possible. Any numerical values, however, inherently contain certain errors necessarily resulting from error found in their respective measurements.

The description and figures disclose a lubrication apparatus. Generally, the lubrication apparatus is configured to coat a surface of a bushing with a uniform layer of a lubricant material such that the bushing can be inserted into a bushing carrier with the lubricant material acting to reduce the insertion force.

Figure 1:
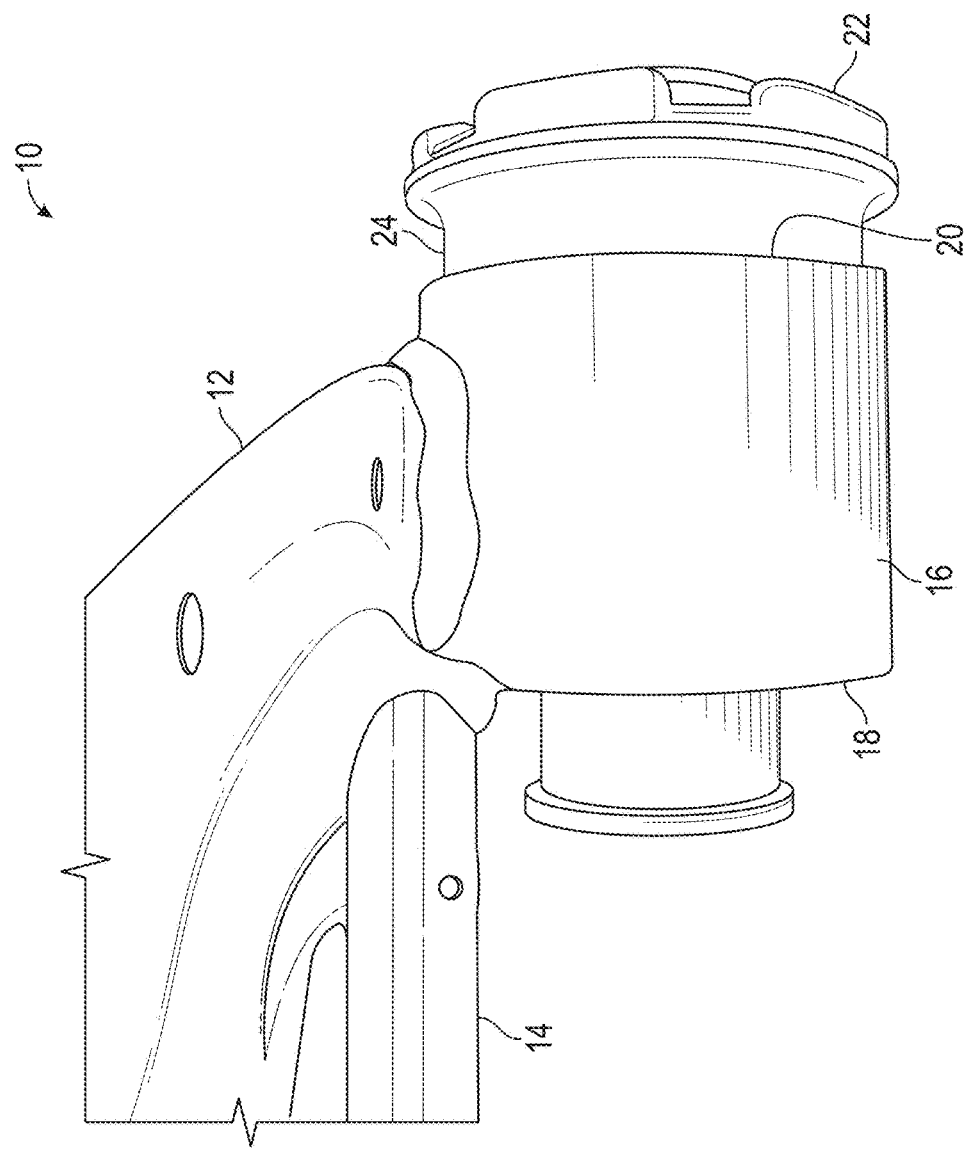
FIG. 1 is a perspective view of a bushing partially installed in a bushing carrier of a control arm of a vehicle.

Referring now to FIG. 1, a representative embodiment of a vehicular control arm assembly is illustrated generally at 10. The control arm assembly 10 is formed with structural members 12 and 14. The structural members 12 and 14 are configured to support a bushing carrier 16. The bushing carrier 16 is formed from a hollow member having a cavity 18 extending therethrough and defined by an inner circumferential wall 20. The inner circumferential wall 20 has a substantially smooth surface and is configured to receive a bushing 22. The bushing 22 has a smooth outer surface 24 that engages the inner circumferential wall 20 of the bushing carrier 16. In operation, the bushing 22 is received by the bushing carrier 16 such that the outer surface 24 of the bushing 22 and the inner circumferential wall 20 of the bushing carrier 16 have an interference fit. The term "interference fit" (also known as a press fit or friction fit), as used herein, is defined to mean a fastening between two parts which is achieved by friction after the parts are pushed together, rather than by any other means of fastening.

In the embodiment illustrated in FIG. 1, the interference fit between the bushing carrier 16 and the bushing 22 is achieved by an insertion force acting on the bushing 22. In the event the interference fit is achieved without lubrication material applied to either of the inner circumferential wall 20 of the bushing carrier 16, the outer surface 24 of the bushing 22 or both, the insertion force is greater than if lubrication material is used. Further, in the event that lubrication material is used in the insertion process, it is desirable to achieve a uniform layer of lubrication material over the affected surfaces.

Figure 2:
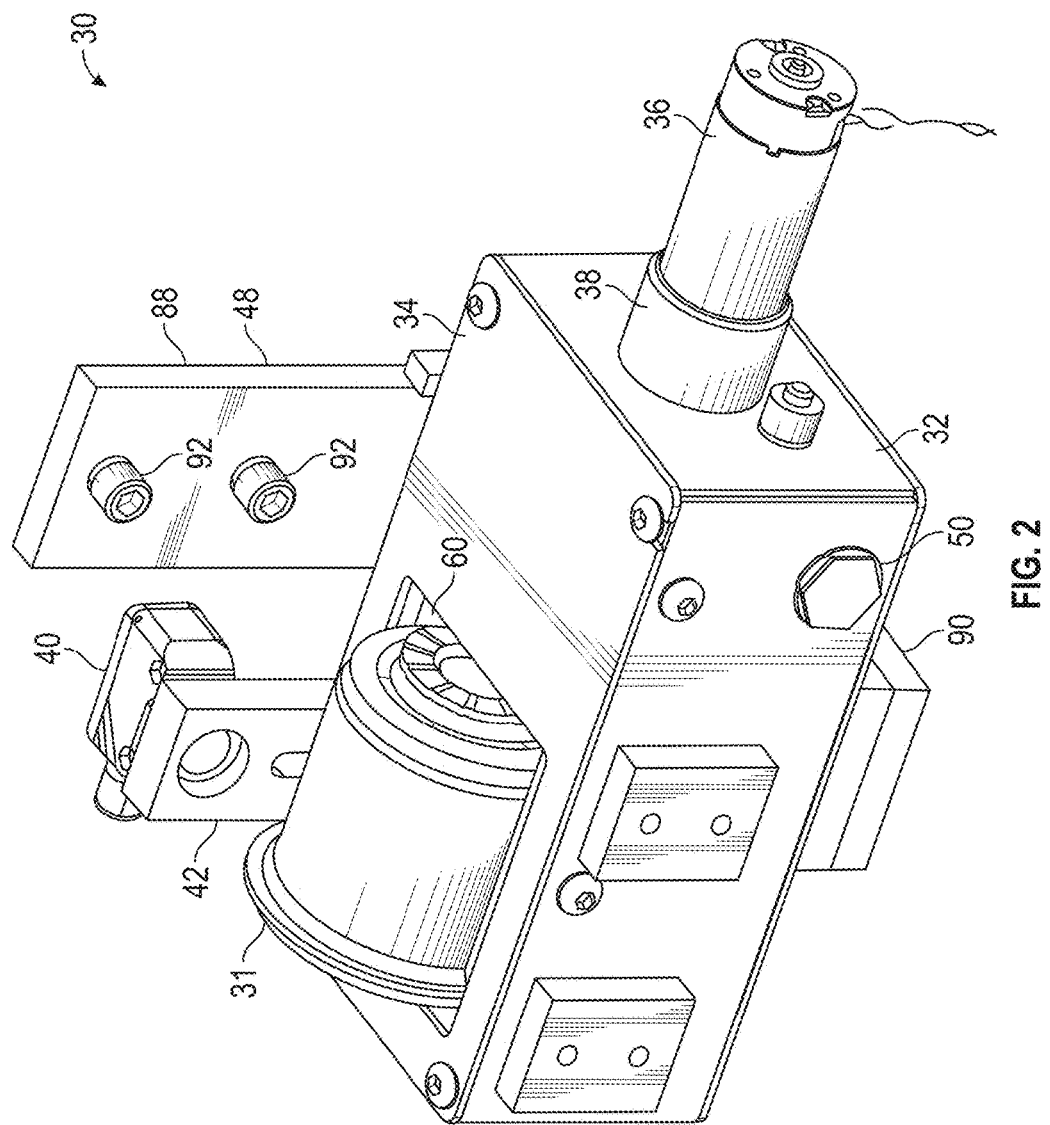
FIG. 2 is a perspective view of a lubrication apparatus.
Figure 3:
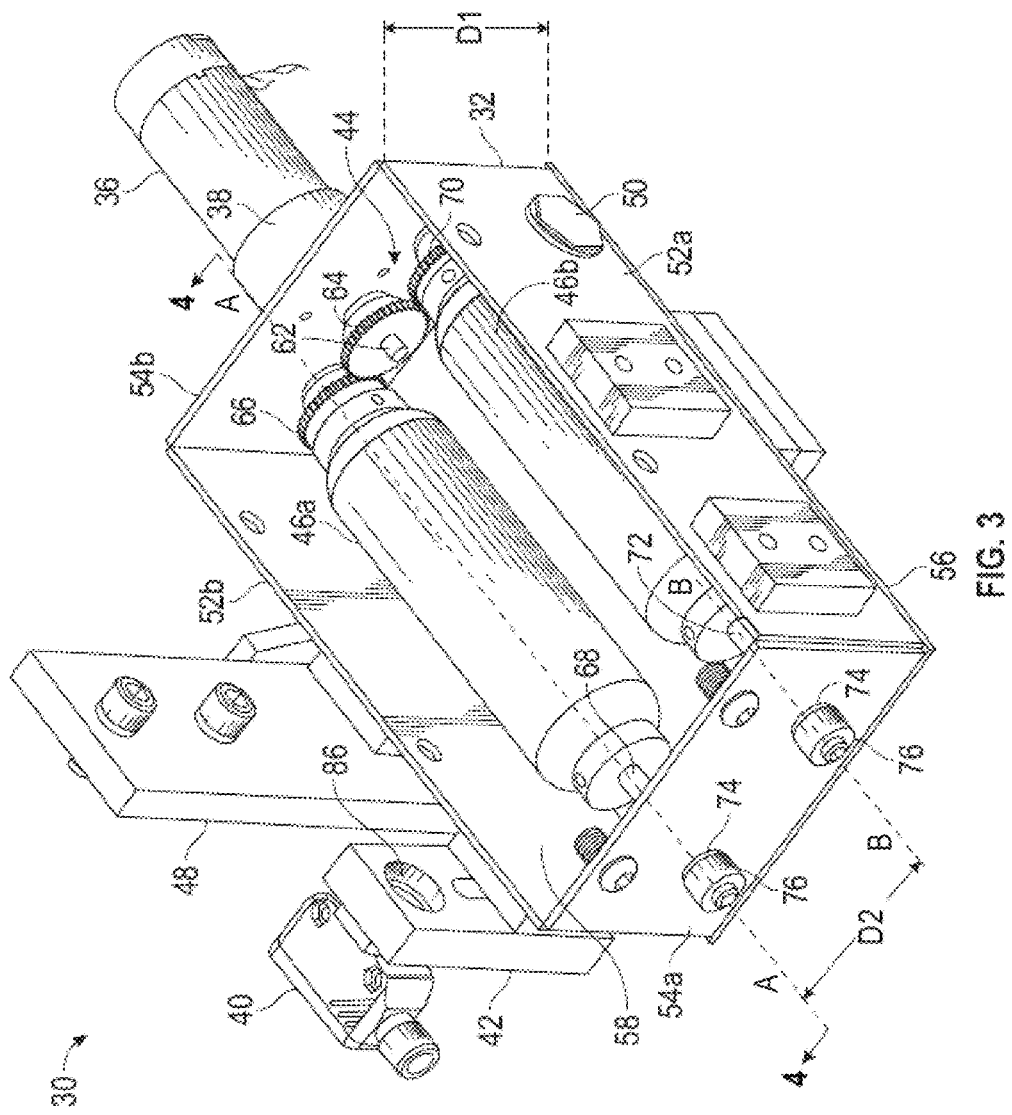
FIG. 3 is a perspective view of the lubrication apparatus of FIG. 2 shown without a tray cover.
Figure 4:
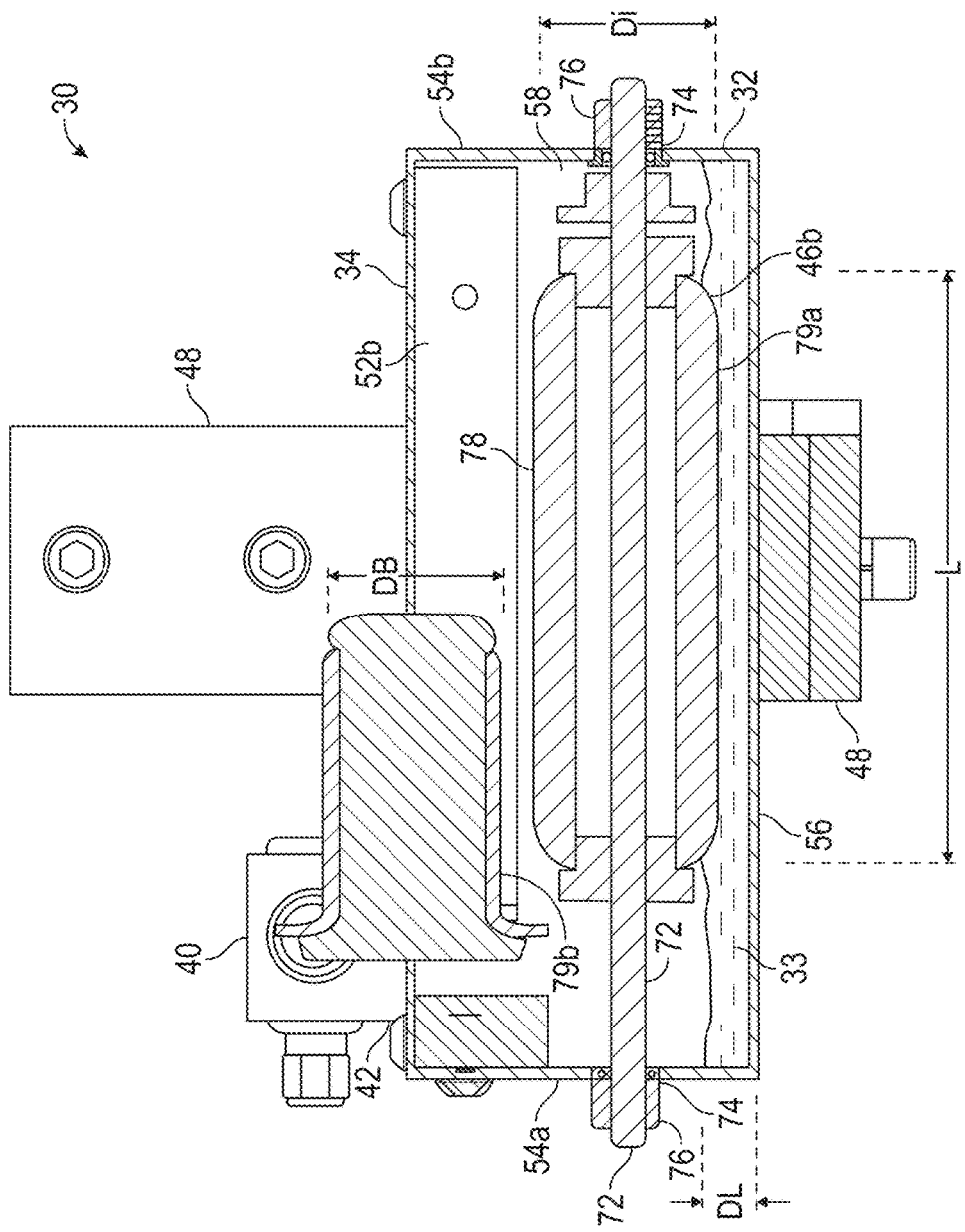
FIG. 4 is a cross-sectional side view of the lubrication apparatus of FIG. 2, taken along the plane 4-4.

Referring now to FIGS. 2-4, a first embodiment of a lubrication apparatus 30 is illustrated at 30. The lubrication apparatus 30 is configured to apply a generally uniform coating of lubrication material to an outer surface of a bushing 31 configured for an interference fit with a bushing carrier, such as to reduce the insertion force of the bushing 31 into a bushing carrier.

Referring now to FIGS. 2-4, the lubrication apparatus 30 includes a tray 32, a tray cover 34, a motor 36, a motor mount 38, a sensor 40, a sensor mount 42, a drive assembly 44, a plurality of lubrication roller assemblies 46a, 46b and a lubrication material 33. The lubrication apparatus 30 further includes an optional apparatus mounting assembly 48 and an optional sight gauge 50.

Referring again to FIGS. 2-4, the tray 32 is configured to house the drive assembly 44 and the plurality of roller assemblies 46a, 46b. The tray 32 is further configured to house a volume of lubrication material, shown schematically at 33 in FIG. 4. The tray 32 includes opposing side members 52a, 52b and opposing end members 54a, 54b. The side members 52a, 52b and the end members 54a, 54b are connected to a bottom member 56 in a manner such that the tray 32 houses the lubrication material without leakage of the lubrication material at the intersections of the side and end members 52a, 52b, 54a, 54b and the bottom member 56. In certain embodiments, the side and end members 52a, 52b, 54a, 54b and the bottom member 56 forming the tray 32 can be stamped in a single stamping operation from a unitary section of metallic sheet material, such as the non-limiting example of steel or aluminum. However, it is also within the contemplation of the lubrication apparatus 30 that the side and end members 52a, 52b, 54a, 54b and the bottom member 56 can be individual, discrete members that are joined together to form the tray 32. It is further contemplated that the side and end members 52a, 52b, 54a, 54b can be formed from reinforced polymeric materials.

Referring now to FIGS. 3 and 4, the side and end members 52a, 52b, 54a, 54b and the bottom member 56 define a cavity 58 therewithin. The cavity 58 is configured with a depth D1 such that the drive assembly 44 and the roller assemblies 46a, 46b are contained in the cavity 58 and not in contact with the tray cover 34. In the illustrated embodiment, the depth D1 is in a range of from about 2.0 inches to about 4.0 inches. However, in other embodiments, the depth D1 can be less than about 2.0 inches or more than about 4.0 inches sufficient that the drive assembly 44 and the roller assemblies 46a, 46b are contained in the cavity 58 and not in contact with the tray cover 34.

Referring now to FIG. 2, the tray cover 34 is configured to attach to the side and end members 52a, 52b, 54a, 54b, and further configured to substantially cover the cavity 58. In certain instances, the tray cover 34 can be formed from the same materials as the side and end members 52a, 52b, 54a, 54b. In other instances, the tray cover 34 and the side and end members 52a, 52b, 54a, 54b can be formed from different materials.

Referring now to FIGS. 2 and 3, the tray cover 34 includes an aperture 60. The aperture 60 has a cross-sectional size and shape that approximates the cross-sectional size and shape of the bushing 31. The aperture 60 is configured to receive the bushing 31 such that the bushing 31 can rest on the roller assemblies 46a, 46b.

Referring again to FIGS. 2 and 3, the motor 36 is mounted to the tray 32 with the motor mount 38. In the illustrated embodiment, the motor 36 is a 24 volt direct current (D.C.) gear motor providing a torque in a range of from about 150 oz-in to about 200 oz-in, such as the Pittmann Model GM8224S028. However, in other embodiments, the motor 36 can be other suitable gear motors.

Referring again to FIGS. 2 and 3, the motor mount 38 is a generally hollow structure having a gear train (not shown) contained therein. The gear train is configured to reduce the rotational speed of the motor 36. The gear train includes an output shaft 62 that extends into the cavity 58. The output shaft 62 is attached to a drive gear 64 such that the output shaft 62 and the drive gear 64 rotate together.

Referring now to FIGS. 3 and 4, the drive gear 64 is configured to engage a first spur gear 66 mounted on a first axle 68 and a second spur gear 70 mounted on a second axle 72. As the drive gear 64 is rotated by the output shaft 62 of the gear train, the drive gear 64 transmits the rotation to the first and second spur gears 66, 70, which in turn transmit the rotation to the first and second axles 68, 72.

Referring now to FIGS. 3 and 4, the first and second axles 68, 72 are mounted for rotation with outward portions of the first and second axles 68, 72 being positioned in bearings 74 mounted in the end members 54a, 54b. The ends of the first and second axles 68, 72 are secured in place with shaft collars 76 and set screws (not shown).

Referring again to FIGS. 3 and 4, the first axle 68 is configured to support the roller assembly 46a for rotation and the second axle 72 is configured to support the roller assembly 46b for rotation. Each of the roller assemblies 46a, 46b includes an outer circumferential surface 78 suitable to apply a uniform layer of the lubricant material to a surface of the bushing 31. In the illustrated embodiment, the roller assemblies 46a, 46b are commercially available, disposable, foam-based paint rollers configured to slide onto the first and second axles 68, 72. One non-limiting example of a suitable commercially available, disposable paint roller has a length L of about 4.5 inches, a diameter D1 of about 1.25 inches and a nap (not shown) of about 0.375 inches. However, it should be appreciated that other commercially available, disposable paint rollers can be used.

Referring again to FIGS. 3-5, in operation the motor 36 drives the gear train, the output shaft 62, the drive gear 64 and the first and second spur gears 66, 70 such that the roller assemblies 46a, 46b have a rotational speed in a range of from about 2.0 revolutions per minute to about 10 revolutions per minute. It has been found that the rotational speed of about 2.0 revolutions per minute to about 10 revolutions per minute advantageously facilitates application of the lubricant material 33 to a surface of the bushing 31 by the roller assemblies 46a, 46b while substantially preventing the lubricant material 33 from flying off of the outer circumferential surface 78 of the roller assemblies 46a, 46b. It has also been found the rotational speed of about 2.0 revolutions per minute to about 10 revolutions per minute advantageously provides the application of uniform layer of the lubricant material 33 within a single revolution of the bushing 31.

Referring now to FIG. 4, the lubrication material 33 forms a layer adjacent the bottom member 56 of the tray 32. As the roller assemblies 46a, 46b rotate about the first and second axles 68, 72, the outer circumferential surface 78 enters the layer of lubrication material 33 and is exposed to the lubrication material 33 for a time sufficient for the outer circumferential surface 78 to absorb some of the lubrication material 33. The outer circumferential surface 78, having the absorbed lubrication material 33, is rotated out of the layer of lubrication material and engages a surface of the bushing 31. The rotation of the roller assemblies 46a, 46b causes rotation of the bushing 31 through a frictional force formed between the outer circumferential surface 78 and an outer surface of the bushing 33, which in turn results in a deposit of the lubrication material 33 on the outer surface of the bushing 33.

Referring again to FIG. 4, the lubrication material 33 forms a depth DL from the bottom surface 56. The depth DL of the lubrication material 33 is in a range to contact a lower surface 79a of the roller assemblies 46a, 46b and below a lower surface 79b of the bushing. It the depth DL of the lubrication material 33 does not contact the lower surface 79a of the roller assemblies 46a, 46b, then the lubricant material 33 is not transferred to the roller assemblies 46, 46b. In the event the depth DL of the lubrication material 33 is higher than the lower surface 79b of the bushing 31, then the bushing 31 sits in the lubrication material 33 and does not receive a uniform layer of lubrication material 33 as the bushing 31 rotates.

In the illustrated embodiment, the lubricant material 33 is a temporary machine assembly lubricant, such as the non-limiting example of P-80. In other embodiments, other suitable lubricant materials can be used.

Referring again to FIG. 3, the roller assembly 46a rotates about axis A-A and roller assembly 46b rotates about axis B-B. The axes A-A and B-B are parallel and separated by a distance D2. The distance D2 is less than a diameter DB of the bushing 31, as shown in FIG. 4 and is configured to maintain the bushing 31 in a position vertically about the lubrication material 33. In the illustrated embodiment, the distance D2 is in a range of from about 0.75 inches to about 5.0 inches, corresponding to a bushing diameter DB in a range of from about 0.50 inches to about 5.5 inches. However, in other embodiments, the distance D2 can be less than 0.75 inches or more than 5.5 inches, depending on the bushing diameter DB, sufficient to maintain the bushing 31 in a position vertically about the lubrication material 33.

Figure 5:
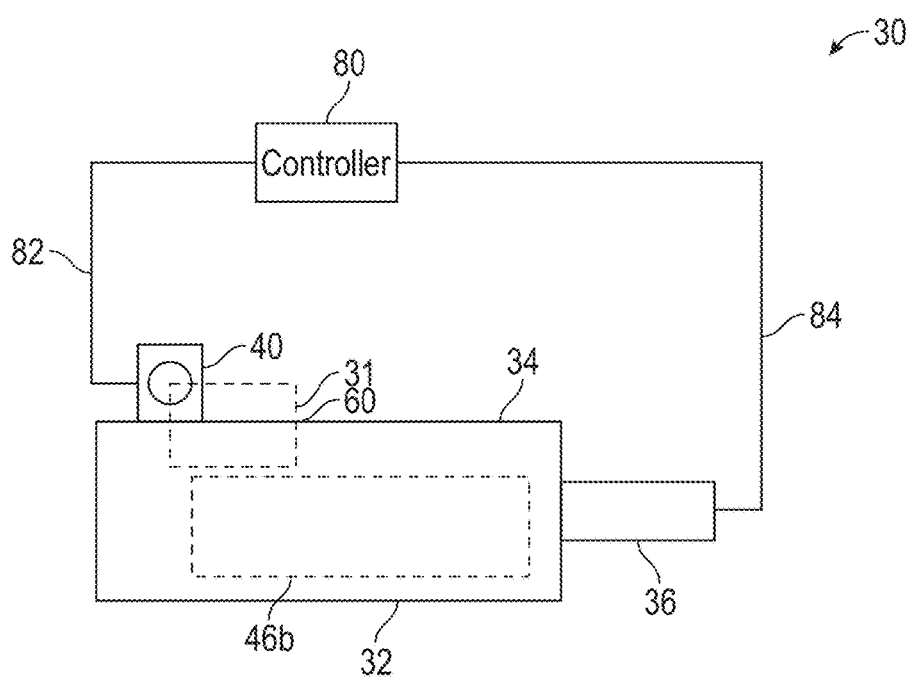
FIG. 5 is a schematic diagram of the lubrication apparatus 30 of FIG. 2 shown with a controller.

Referring now to FIG. 5, a schematic diagram of the lubrication apparatus 30 is illustrated. The lubrication apparatus 30 includes the tray 32, the motor 36 and the sensor 40. A representative bushing 31 is shown in phantom lines in an engagement position with the roller assemblies 46a, 46b. The sensor 40 is configured to sense the presence of a bushing 31 positioned in the aperture 60 of the tray cover 34 and engaged with the roller assemblies 46a, 46b. The sensor 40 is in electrical communication with a controller 80 via a plurality of first electrical wires 82. The controller 80 is in electrical communication with the motor 36 via a plurality of second electrical wires 84. In operation, in the event the sensor 40 senses the presence of a bushing 31 in the aperture 60 of the tray cover 34 and engaged with the roller assemblies 46a, 46b, the sensor 40 generates a confirming signal and sends the confirming signal to the controller 80. The controller 80 receives the confirming signal and generates a run signal, which is provided to the motor 36. In the event the sensor 40 does not sense the presence of a bushing 31 in the aperture 60 of the tray cover 34 and engaged with the roller assemblies 46a, 46b, the controller 80 does not receive a confirming signal from the sensor 40 and, in turn, the motor 36 does not receive a run signal from the controller 80.

In the embodiment illustrated in FIG. 5, the sensor 40 is a photoelectric sensor such as the model OGH280, marketed by IFM Efector, Incorporated. However, in other embodiments, the sensor 40 can be other devices and can have other structures sufficient to sense the presence of a bushing 31 in the aperture 60 of the tray cover 34 and send a confirming signal to the controller 80.

In the embodiment illustrated in FIG. 5, the controller 80 is a conventional programmable logic controller (PLC) as is well known in the art. However, in other embodiments, other suitable devices and mechanisms can be used.

Referring now to FIG. 3, the sensor 40 is mounted to the tray 32 with a sensor mount 42. The sensor mount 42 includes an aperture 86, through which the sensor 40 has exposure to the bushing 31. It should be appreciated that the sensor mount 42 can have any desired structure sufficient to mount the sensor 40 to the tray 32 in a manner that exposes the sensor 40 to the bushing 31.

Referring now to FIG. 2, the lubrication apparatus 30 can include the optional apparatus mounting assembly 48. The apparatus mounting assembly 48 is configured to mount the lubrication apparatus 30 on a portion of a vertical surface (not shown), such as the non-limiting examples of a wall, workbench back or building beam. The apparatus mounting assembly 48 includes a vertical element 88 extending from a horizontal element 90. The vertical element 88 is configured for attachment to the vertical surface with fasteners 92. The horizontal element 90 is configured to support the lubrication apparatus 30. In the illustrated embodiment, the vertical and horizontal elements 88, 90 are formed from metallic materials, such as the non-limiting example of steel bar stock. However, in alternate embodiments, the vertical and horizontal elements 88, 90 can be formed from other suitable materials.

While the embodiment of the lubrication apparatus 30 shown in FIGS. 2-4 show the optional apparatus mounting assembly 48, it should be appreciated that in other embodiments, the lubrication apparatus 30 can be operated when mounted to other structures in other manners. Non-limiting examples of other arrangements include mounting the lubrication apparatus to horizontally arranged work surfaces and freestanding tool stands.

Referring again to FIG. 2, the lubrication apparatus 30 can include the optional sight gauge 50. The sight gauge 50 is configured to provide external visual inspection of the lubrication material 33 contained within the tray 32. In the embodiment illustrated in FIG. 2, the sight gauge 50 is a plastic oil level sight glass such as the model TNT marketed by J.W. Winco, incorporated. In other embodiments, the sight gauge 50 can be other structures, devices and mechanisms sufficient to provide external visual inspection of the lubrication material 33 contained within the tray 32.

While the embodiment of the lubrication apparatus 30 illustrated in FIGS. 2-4 has been described above in the context of a vehicular bushing, it should be appreciated that in other embodiments, the lubrication apparatus 30 can be adapted for use with other suitable bushings and bushings having different diameters, such as the non-limiting examples of bushings used in machinery, appliances and electrical apparatus.

The principle and mode of operation of the lubrication apparatus have been described in certain embodiments. However, it should be noted that the lubrication apparatus may be practiced otherwise than as specifically illustrated and described without departing from its scope.

What is claimed is:

1. A lubrication apparatus configured to apply a substantially uniform layer of a lubricant material to an outer surface of a bushing, the lubrication apparatus comprises;
   a tray having opposing sides and opposing ends, the opposing sides and opposing ends attached to a bottom member such as to form a cavity therewithin;
   a plurality of roller assemblies positioned within the cavity, the roller assemblies configured for rotation, the roller assemblies further configured to receive the bushing therebetween;
   a motor mounted to the tray and configured to rotate the plurality of roller assemblies, wherein rotation of the plurality of roller assemblies urges rotation of the bushing through a frictional force formed between the plurality of roller assemblies and the bushing;
   a lubricant material positioned in the tray and configured to contact the roller assemblies, wherein rotation of the roller assemblies brings the lubricant material into contact with the outer surface of the bushing;
   the motor and the roller assemblies further configured such that a single revolution of the bushing results in a substantially uniform layer of the lubricant material on the outer surface of a bushing.

2. The lubrication apparatus of claim 1, wherein the tray has a depth such that the roller assemblies are contained in the cavity.

3. The lubrication apparatus of claim 2, wherein the depth of the tray is in a range of from about 2.0 inches to about 4.0 inches.

4. The lubrication apparatus of claim 2, wherein the lubricant has a minimum depth sufficient to contact the roller assemblies.

5. The lubrication apparatus of claim 2, wherein the lubricant has a maximum depth that is below a lower surface of the bushing.

6. The lubrication apparatus of claim 2, wherein a sensor is attached to the tray and configured to sense the presence of the bushing.

7. The lubrication apparatus of claim 6, wherein the sensor is configured for electrical communication with a controller, and wherein the controller is configured to allow rotation of the motor in the event the sensor senses the bushing.

8. The lubrication apparatus of claim 1, wherein a drive gear is connected to the motor and configured to drive a first spur gear and a second spur gear, and wherein the first and second spur gears are configured to drive the plurality of roller assemblies.

9. The lubrication apparatus of claim 8, wherein each of the roller assemblies is configured for a rotational speed in a range of from about 2.0 revolutions per minute to about 10 revolutions per minute.

10. The lubrication apparatus of claim 1, wherein a tray cover is attached to the tray, the tray cover having an aperture configured to receive the bushing.

11. A method of applying a substantially uniform layer of a lubricant material to an outer surface of a bushing, the method comprising the steps of;
    forming a cavity within a tray;
    positioning a plurality of roller assemblies within the cavity, the roller assemblies configured for rotation, the roller assemblies further configured to receive the bushing therebetween;
    rotating the plurality of roller assemblies with a motor, wherein rotation of the plurality of roller assemblies urges rotation of the bushing through a frictional force formed between the plurality of roller assemblies and the bushing;
    positioning a lubricant material within the tray such that the lubricant material contact the roller assemblies, wherein rotation of the roller assemblies brings the lubricant material into contact with a surface of the bushing;
    rotating the roller assemblies with a single revolution, thereby forming a substantially uniform layer of the lubricant material on the outer surface of a bushing.

12. The method of claim 11, wherein the tray has a depth such that the roller assemblies are contained in the cavity.

13. The method of claim 11, wherein a drive gear is connected to the motor and configured to drive a first spur gear and a second spur gear, and wherein the first and second spur gears are configured to drive the plurality of roller assemblies.

14. The method of claim 13, wherein each of the roller assemblies is configured for a rotational speed in a range of from about 2.0 revolutions per minute to about 10 revolutions per minute.

15. The method of claim 11, wherein the lubricant has a minimum depth sufficient to contact the roller assemblies.

16. The method of claim 11, wherein the lubricant has a maximum depth that is below a lower surface of the bushing.

17. The method of claim 11, wherein a sensor is attached to the tray and configured to sense the presence of the bushing.

18. The method of claim 17, wherein the sensor is configured for electrical communication with a controller, and wherein the controller is configured to allow rotation of the motor in the event the sensor senses the bushing.

19. The method of claim, 17, including the step of mounting the sensor to the tray with a sensor mount, the sensor mount having an aperture through which the sensor has exposure to the bushing.

20. The method of claim 11, wherein a tray cover is attached to the tray, the tray cover having an aperture configured to receive the bushing.

* * * * *